United States Patent
Deng

(10) Patent No.: US 10,748,504 B2
(45) Date of Patent: Aug. 18, 2020

(54) ENERGY-SAVING METHOD FOR DISPLAY APPARATUS, DEVICE AND DISPLAY APPARATUS

(71) Applicant: SHENZHEN CHINA STAR OPTOELECTRONICS SEMICONDUCTOR DISPLAY TECHNOLOGY CO., LTD., Guangdong (CN)

(72) Inventor: Yufan Deng, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 304 days.

(21) Appl. No.: 15/743,240

(22) PCT Filed: Dec. 21, 2017

(86) PCT No.: PCT/CN2017/117755
§ 371 (c)(1),
(2) Date: Jan. 9, 2018

(87) PCT Pub. No.: WO2019/085226
PCT Pub. Date: May 9, 2019

(65) Prior Publication Data
US 2020/0082784 A1   Mar. 12, 2020

(30) Foreign Application Priority Data

Nov. 3, 2017  (CN) .......................... 2017 1 1075457

(51) Int. Cl.
*H04W 52/02*   (2009.01)
*G09G 5/02*   (2006.01)
(Continued)

(52) U.S. Cl.
CPC ................. *G09G 5/02* (2013.01); *G06T 7/90* (2017.01); *G06T 11/001* (2013.01);
(Continued)

(58) Field of Classification Search
CPC .... G06F 1/3203; G06F 1/3218; G06F 1/3265; G06T 7/90; G06T 11/001; G09G 3/2003;
(Continued)

(56) References Cited

U.S. PATENT DOCUMENTS 7,999,826 B2   8/2011   Mawatari et al.
8,233,013 B2   7/2012   Morisue et al.
(Continued)

FOREIGN PATENT DOCUMENTS

CN   101600120 A   12/2009
CN   101945292 A   1/2011
(Continued)

*Primary Examiner* — Michael J Eurice
(74) *Attorney, Agent, or Firm* — Hemisphere Law, PLLC; Zhigang Ma

(57) ABSTRACT

The present application discloses an energy-saving method for a display apparatus, a device and a display apparatus. The method includes: receiving an instruction to switch to an energy-saving mode; responding to the instruction, converting a color gamut of an input image to obtain an output image, the output image for performing display by the display apparatus, a corresponding component in a color coordinate of a selected primary color of the output image is smaller than the corresponding component in the color coordinate of the selected primary color of the input image, an luminance of the selected primary color of the output image is less than or equal to the luminance of the selected primary color of the input image; wherein a light-emitting efficiency of a selected primary color sub-pixel of the
(Continued)

Receiving an instruction to switch to an energy-saving mode. — 31

Reading the color coordinate of the selected primary color corresponding to the energy-saving level, and calculating the corresponding color gamut conversion matrix according to the color coordinate of the corresponding selected primary color — 32

Multiplying each pixel of the input image by a color gamut conversion matrix to obtain an output image. — 33 display apparatus is lowest to reduce the power consumption of the most-used selected primary-color sub-pixel and save energy.

18 Claims, 2 Drawing Sheets

(51) Int. Cl.
  *G06T 7/90* (2017.01)
  *G06T 11/00* (2006.01)
(52) U.S. Cl.
  CPC .............. *G09G 2320/0666* (2013.01); *G09G 2330/023* (2013.01); *H04W 52/02* (2013.01)
(58) Field of Classification Search
  CPC .......... G09G 3/3406; G09G 5/10; G09G 5/02; G09G 5/026; G09G 5/06; G09G 2300/0452; G09G 2320/0666; G09G 2320/0673; G09G 2330/021; G09G 2340/06; G09G 2360/16; Y02D 70/00; H04N 1/6058; H04W 52/0232; H04W 52/0251; H04W 52/0274; H04W 52/0277; H04W 52/028
  See application file for complete search history.

(56) References Cited

U.S. PATENT DOCUMENTS

| | | | |
|---|---|---|---|
| 8,274,525 B2 | 9/2012 | Langendijk | |
| 9,497,707 B2* | 11/2016 | Wan | H04W 52/0274 |
| 2002/0111200 A1* | 8/2002 | Nikawa | H04W 52/027 |
| | | | 455/574 |
| 2003/0009703 A1* | 1/2003 | Oshima | G06F 1/3218 |
| | | | 713/323 |
| 2003/0131274 A1* | 7/2003 | Mizuyabu | G06F 1/10 |
| | | | 713/324 |
| 2004/0066363 A1* | 4/2004 | Yamano | G09G 3/20 |
| | | | 345/98 |
| 2004/0201583 A1* | 10/2004 | Burroughes | G06F 1/3203 |
| | | | 345/211 |
| 2005/0001857 A1* | 1/2005 | Nakakita | G09G 5/39 |
| | | | 345/690 |
| 2005/0057484 A1* | 3/2005 | Diefenbaugh | G09G 3/3406 |
| | | | 345/102 |
| 2006/0001658 A1* | 1/2006 | Plut | G06F 1/3218 |
| | | | 345/211 |
| 2006/0101293 A1* | 5/2006 | Chandley | G06F 1/3203 |
| | | | 713/300 |
| 2007/0085789 A1 | 4/2007 | De Vaan | |
| 2007/0165035 A1* | 7/2007 | Duluk, Jr. | G06T 1/60 |
| | | | 345/506 |
| 2008/0100554 A1* | 5/2008 | Mori | G09G 3/3406 |
| | | | 345/89 |
| 2008/0303767 A1* | 12/2008 | Ludden | G09G 3/3688 |
| | | | 345/89 |
| 2008/0303836 A1* | 12/2008 | Ludden | G09G 3/2092 |
| | | | 345/531 |
| 2010/0066765 A1* | 3/2010 | Lee | G06F 1/3203 |
| | | | 345/690 |
| 2010/0164937 A1* | 7/2010 | Kim | G09G 3/3225 |
| | | | 345/212 |
| 2010/0208042 A1* | 8/2010 | Ikeda | G11B 20/1251 |
| | | | 348/53 |
| 2010/0225673 A1 | 9/2010 | Miller et al. | |
| 2010/0295839 A1* | 11/2010 | Nagaya | G06F 1/3265 |
| | | | 345/212 |
| 2011/0050695 A1* | 3/2011 | Sullivan | G06T 11/001 |
| | | | 345/426 |
| 2011/0069089 A1* | 3/2011 | Kopf | G09G 3/3208 |
| | | | 345/690 |
| 2011/0134021 A1* | 6/2011 | Schmitz | H05B 33/0827 |
| | | | 345/83 |
| 2012/0092318 A1* | 4/2012 | Mishra | G06F 3/1438 |
| | | | 345/211 |
| 2013/0093783 A1* | 4/2013 | Sullivan | G09G 5/06 |
| | | | 345/601 |
| 2013/0208031 A1* | 8/2013 | Mario | G09G 5/14 |
| | | | 345/694 |
| 2013/0286271 A1* | 10/2013 | Ishii | G09G 3/3607 |
| | | | 348/333.01 |
| 2014/0029498 A1* | 1/2014 | Kim | H04W 52/0277 |
| | | | 370/311 |
| 2014/0049527 A1* | 2/2014 | Lanzoni | G09G 3/36 |
| | | | 345/207 |
| 2014/0063074 A1* | 3/2014 | Drzaic | G09G 3/30 |
| | | | 345/690 |
| 2015/0070742 A1* | 3/2015 | Sorek | G02F 1/13306 |
| | | | 359/238 |
| 2015/0084980 A1* | 3/2015 | Zeng | G09G 3/2003 |
| | | | 345/601 |
| 2015/0257098 A1* | 9/2015 | Yu | H04W 24/08 |
| | | | 370/311 |
| 2015/0277540 A1* | 10/2015 | Jackson | G06F 1/3265 |
| | | | 345/169 |
| 2016/0070047 A1* | 3/2016 | Okuyama | G09G 3/3607 |
| | | | 349/71 |
| 2016/0117967 A1* | 4/2016 | Buckley | G09G 3/2003 |
| | | | 345/691 |
| 2018/0144715 A1* | 5/2018 | Shigeta | G09G 3/32 |
| 2018/0233075 A1* | 8/2018 | Boyd | G09G 3/2003 |
| 2018/0350323 A1* | 12/2018 | Whitehead | G09G 5/026 |

FOREIGN PATENT DOCUMENTS

| | | |
|---|---|---|
| CN | 102547306 A | 7/2012 |
| CN | 104661004 A | 5/2015 |
| CN | 104732925 A | 6/2015 |
| CN | 105513559 A | 4/2016 |
| JP | H04244747 A | 9/1992 |

* cited by examiner

ENERGY-SAVING METHOD FOR DISPLAY APPARATUS, DEVICE AND DISPLAY APPARATUS

RELATED APPLICATIONS

The present application is a National Phase of International Application Number PCT/CN2017/117755, filed Dec. 21, 2017, and claims the priority of China Application 201711075457.9 filed Nov. 3, 2017.

FIELD OF THE DISCLOSURE

The disclosure relates to a display technical field, and more particularly to an energy-saving method for a display apparatus, a device and a display apparatus.

BACKGROUND

Saturation, luminance and etc. are important indicators of the display apparatus, can improve the image viewing property, but the power consumption of the display apparatus is relatively large, too high luminance is not conducive to people's health. In order to meet the needs of different scenarios, it is necessary to develop energy-saving models of the display apparatus to reduce energy consumption.

In the conventional technology, the energy-saving method is to turn off the backlight or reduce the luminance of the backlight after determining that the image signals of the front and rear frame are the same. This technique does not reduce power consumption according to the characteristics of the display apparatus, but after detecting the still image to reduce the luminance of the backlight, so that the luminance of the entire image will be reduced, affecting the visual effects and energy-saving efficiency is low.

SUMMARY

The main problem to be solved of the present invention is to provide an energy-saving method for a display apparatus, device and display apparatus, to solve the problem of low energy-saving efficiency in the energy-saving mode of the display apparatus in the conventional technology.

In order to solve the above technical problem, one technical solution adopted by the present invention is to provide an energy-saving device for a display apparatus including a storage and a processor connected to each other, the storage is configured to store a computer program, the processor is configured to execute the computer program to realize receiving an instruction to switch to an energy-saving mode; responding to the instruction, converting a color gamut of an input image to obtain an output image, the output image for performing display by the display apparatus, a corresponding component in a color coordinate of a selected primary color of the output image is smaller than the corresponding component in the color coordinate of the selected primary color of the input image, an luminance of the selected primary color of the output image is less than or equal to the luminance of the selected primary color of the input image; wherein a light-emitting efficiency of a selected primary color sub-pixel of the display apparatus is lower than the light-emitting efficiency of other primary color sub-pixels; wherein the energy-saving mode is divided into a plurality of energy-saving levels, each energy-saving level corresponds to the color coordinate and the color gamut conversion matrix of different selected primary colors, respectively; and wherein the color coordinates of the other primary colors and white color of the input image and the output image remain unchanged.

In order to solve the above technical problem, one technical solution adopted by the present invention is to provide an energy-saving method for a display apparatus, including the following steps: receiving an instruction to switch to an energy-saving mode; responding to the instruction, converting a color gamut of an input image to obtain an output image, the output image for performing display by the display apparatus, a corresponding component in a color coordinate of a selected primary color of the output image is smaller than the corresponding component in the color coordinate of the selected primary color of the input image, an luminance of the selected primary color of the output image is less than or equal to the luminance of the selected primary color of the input image; and wherein a light-emitting efficiency of a selected primary color sub-pixel of the display apparatus is lower than the light-emitting efficiency of other primary color sub-pixels.

In order to solve the above technical problem, one technical solution adopted by the present invention is to provide a display apparatus including an energy-saving device for display apparatus, wherein the energy-saving device for display apparatus includes a storage and a processor connected to each other, the storage is configured to store a computer program, the processor is configured to execute the computer program to realize: receiving an instruction to switch to an energy-saving mode; responding to the instruction, converting a color gamut of an input image to obtain an output image, the output image for performing display by the display apparatus, a corresponding component in a color coordinate of a selected primary color of the output image is smaller than the corresponding component in the color coordinate of the selected primary color of the input image, an luminance of the selected primary color of the output image is less than or equal to the luminance of the selected primary color of the input image; and wherein a light-emitting efficiency of a selected primary color sub-pixel of the display apparatus is lower than the light-emitting efficiency of other primary color sub-pixels.

By the above solutions, the beneficial effects of the present invention are: in the energy-saving mode, the input image is performed a color gamut conversion to obtain the output image for display. By the color gamut conversion, the corresponding component of the color coordinate of the selected primary color with low luminous efficiency is reduced, so that the saturation of the selected primary color becomes smaller, the gray scale value of the selected primary color sub-pixel becomes smaller, the color gamut conversion takes into account the display apparatus's own characteristics, even in the case of the same primary color luminance before and after the color gamut conversion, the power consumption of the selected primary color sub-pixel is reduced, and the lost partial luminance is supplemented by other primary color sub-pixels with less energy consumption, so that the overall power consumption is reduced, the power consumption can be further reduced in the case where the luminance of the selected primary color becomes smaller, so that the energy saving efficiency can be improved and the influence on the visual effect can be reduced.

DETAILED DESCRIPTION OF PREFERRED EMBODIMENTS

The technical solutions in the embodiments of the present invention are clearly and completely described below with reference to the accompanying drawings in the embodiments of the present invention. The described embodiments are only some but not all of the embodiments of the present invention. All other embodiments obtained by a person of ordinary skill in the art based on the embodiments of the present invention without creative efforts shall fall within the protection scope of the present invention.

Figure 1:
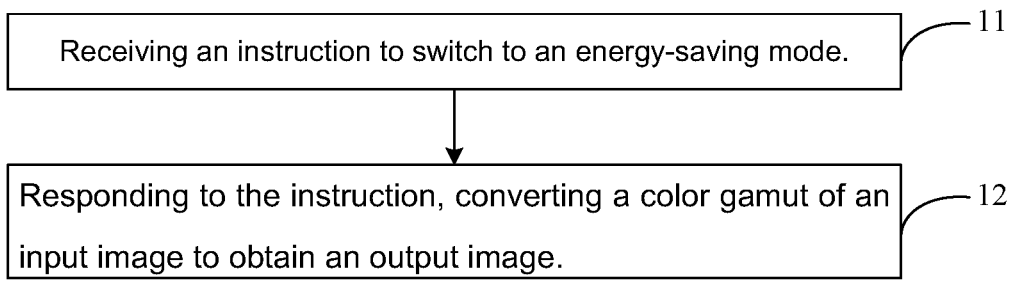
FIG. 1 is a flow chart of an energy-saving method for a display apparatus according to an embodiment of the present invention.

Referring to FIG. 1, FIG. 1 is a flow chart of an energy-saving method for a display apparatus according to an embodiment of the present invention. The energy-saving method for the display apparatus includes:

Step 11: Receiving an instruction to switch to an energy-saving mode.

The instructions may be from an input device, the input device may be a button, a touch panel, or the like, the user may use the input device to perform selection/clicking operations to input instructions, to control the display apparatus to enter the energy-saving mode. The instructions may also be from a controller inside of the display apparatus (which may be integrated with an executive body of this embodiment, or can be a separate and distinct device) or a controller connected to the display apparatus (such as a processor of computer's graphics card or CPU, cell phone, tablet, etc.). For example, the display apparatus panel is set in advance to remain unchanged/after the preset time in a temporary state, the display apparatus enters the energy-saving mode, the controller sends the instruction after reaching the preset time.

Step 12: responding to the instruction, converting a color gamut of an input image to obtain an output image.

The input image may be an image to be displayed, the output image is for display by the display apparatus, a corresponding component in a color coordinate of a selected primary color of the output image is smaller than the corresponding component in the color coordinate of the selected primary color of the input image. A luminance of the selected primary color of the output image is less than or equal to the luminance of the selected primary color of the input image.

Wherein, a light-emitting efficiency of the selected primary color sub-pixel of the display apparatus is lower than the light-emitting efficiency of the other primary color sub-pixels. The present embodiment is suitable for self-emitting displays, such as LED display apparatus, OLED display apparatus, plasma display apparatus and the like.

For example, for an RGB AMOLED display apparatus, the light-emitting efficiency of the blue sub-pixel is lowest; in order to emit light of the same luminance as red and green, a larger current is required, blue can be selected as the selected primary color.

CIE XYZ uses three colors corresponding to red, green and blue as the three primary colors, so that all other colors can be derived from the three colors. By additive color mixing or subtractive color mixing, any color tone can be produced by using different amounts of primary colors, CIE XYZ is the basis for other color systems, X, Y and Z are a red primary color stimulus value, a green primary color stimulus value and a blue primary color stimulus value, respectively, Y also represents the Y also represents the color luminance or radiance, tristimulus value XYZ can be measured directly with the optical device.

CIE xyY is a color space derived directly from CIE XYZ that uses the luminance Y parameter and the color coordinates x and y to describe the color. Y in the CIE xyY color space is equal to Y in the CIE XYZ color space, color coordinate is (x, y), wherein x=X/(X+Y+Z), y=Y/(X+Y+Z), z=Z/(X+Y+Z), x represents a red component, y represents a green component, a blue component z can be determined from the color coordinates (x, y), z=1−x−y.

The luminance is measured by the optical device, the luminance of each primary colors of the display apparatus may also be transformed. For example, if a TV is dimmed to dark, a corresponding luminance of its red (R=255, G=0, B=0) assumed to be 50 nits; in another TV, the luminance is converted to be higher, the corresponding luminance of red may become 100 nits.

Alternatively, the color coordinates of the other primary colors and white color of the input image and the output image may remain unchanged, the corresponding components in the color coordinates of the selected primary color become smaller. Since the color points of the other primary colors and white color remain unchanged, the luminance of the other primary colors in the output image will be reduced, the energy-saving efficiency can be further improved. A ratio of the luminance of the selected primary color in the input image to the output image can be set to a preset value less than or equal to one.

For example, if the selected primary color is blue, the color coordinates of the input image are as shown in the following table, the other colors are kept unchanged except a conversion of the blue color coordinate in the output image, the luminance Y of blue in both the input image and the output image are 16 nits.

| Color | x | y | Y |
|-------|------|------|-----|
| Red | 0.64 | 0.35 | 66 |
| Green | 0.28 | 0.67 | 118 |
| Blue | 0.13 | 0.07 | 16 |
| white | 0.33 | 0.33 | 200 |

A calculation formula of the color gamut conversion matrix A is as follows:

$$A = \begin{bmatrix} a_{11} & 0 & 0 \\ 0 & a_{22} & 0 \\ a_{13} & a_{23} & a_{33} \end{bmatrix}$$

The calculation formula of parameters $a_{11}$, $a_{13}$, $a_{22}$, $a_{23}$, $a_{33}$ in the color gamut conversion matrix is as follows:

$$a_{11}^\gamma = Y_R'/Y_R$$

$$a_{22}^\gamma = Y_G'/Y_G$$

$$[a_{13}^\gamma \ a_{23}^\gamma \ a_{33}^\gamma] \times \begin{bmatrix} X_R & Y_R & Z_R \\ X_G & Y_G & Z_G \\ X_B & Y_B & Z_B \end{bmatrix} = [X_B' \ Y_B \ Z_B']$$

Wherein γ is the gamma of the display apparatus, and $X_R$, $Y_R$, $Z_R$, $X_G$, $Y_G$, $Z_G$, $X_B$, $Z_B$ and $Y_B$ are the tristimulus values of the red, green and blue at the highest gray scale before the conversion, $Y_R'$, $Y_G'$, $Y_B'$ are luminance values of the red, green and blue at the highest gray scale after the conversion, respectively. $X_B'$ and $Z_B'$ are color values of the blue at the highest gray scale after the conversion, respectively. $Y_B'$ is known parameter, the calculation formulas of parameters $Y_R'$ and $Y_G'$ are as follows:

$$[Y_R'/y_R \ Y_G'/y_G \ Y_B'/y_B] \times \begin{bmatrix} x_R & z_R \\ x_G & z_G \\ x_B' & z_B' \end{bmatrix} = [Y_R'/y_W \ Y_G'/y_W \ Y_B'/y_W] \times \begin{bmatrix} x_W & z_W \\ x_W & z_W \\ x_W & z_W \end{bmatrix}$$

Wherein $x_R$、$y_R$、$z_R$、$x_G$、$y_G$、$z_G$、$x_W$、$y_W$、$z_W$ are color coordinate values of red, green and white before the conversion, respectively.

The luminance of the selected primary color of the output image is ratio relationship to the luminance of the selected primary color of the input image, that is, $Y_B' = R*Y_B$, wherein R is a scale factor, $0 \leq R \leq 1$. For example, the luminance of the blue in the input image is 16 nits, the luminance of the blue in the output image should not exceed 16 nits.

For example, in the input image, R, G and B of a pixel value is [0,0,255], the primary color coordinate is [0.13, 0.07], $a_{11}$=0.9440, $a_{22}$=0.9461, $a_{13}$=0.1359, $a_{23}$=0.1121, $a_{33}$=0.9500 in the color gamut conversion matrix, multiplied by the color gamut conversion matrix, the resulting R, G, B of the output image is [35,29,242], the luminance is 16 nits. In the case of the unchanged luminance, the blue component is decreased, to reduce the power consumption.

The tristimulus values (X, Y, Z) of red, green, blue and white before and after conversion are shown in the following table:

| color | Before conversion | | | after conversion | | |
|---|---|---|---|---|---|---|
| | X | Y | Z | X | Y | Z |
| Red | 120 | 66.6 | 1.9 | 105.7 | 57.8 | 1.6 |
| Green | 49.2 | 117.8 | 8.8 | 43.6 | 104.3 | 7.8 |
| Blue | 30.8 | 16.6 | 189.3 | 29.4 | 16.6 | 169.2 |
| white | 200 | 200 | 200 | 178.7 | 178.7 | 178.7 |

As can be seen from the table, after the color gamut conversion, the blue intensity of the Y-stimulus value representing the luminance does not change, but the color coordinates is decreasing, the blue component is decreasing, the red sub-pixels and the green sub-pixels are partially replaced the blue sub-pixels, the luminous efficiency of the red and the green sub-pixels are further higher than the blue sub-pixels, so that the current is decreased, the power consumption is decreased, and the luminance of the red, blue and white are decreasing, the current is decreasing, thereby reducing the power consumption.

Figure 2:
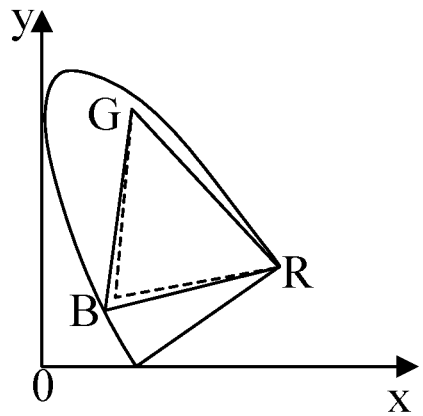
FIG. 2 is a CIE xyY color space chromaticity diagram before and after the color gamut conversion of the present invention.

The CIE xyY color space chromaticity diagram before and after the color gamut conversion is shown in FIG. 2, a triangle formed by the solid line in the figure represents the color gamut before the conversion, the triangle formed by the dotted line represents the color gamut after the conversion, the color corresponding to the defocus point is blue, since the corresponding color coordinates of red and green have not changed, the solid and the dotted lines between red and green are overlapped. It can be seen in the gamut diagram, the area of the triangle is decreasing, the color gamut is decreased.

Compared with the conventional technology, the energy-saving method for a display apparatus disclosed by the present embodiment is by receiving an instruction to switch to an energy-saving mode; responding to the instruction, converting a color gamut of an input image to obtain an output image, the output image is used for the display apparatus to perform the image display, the corresponding component in the color coordinates of the selected primary color in the output image is less than the corresponding component in the color coordinates of the selected primary color of the input image, the luminance of the selected primary color of the output image is less than or equal to the luminance of the selected primary color of the input image; wherein the luminescent efficiency of the selected primary color sub-pixel is lower than the luminescent efficiency of the other primary color sub-pixels. By this way, it is possible to reduce the power consumption of the selected primary color sub-pixel using most energy, thereby saving energy.

Figure 3:
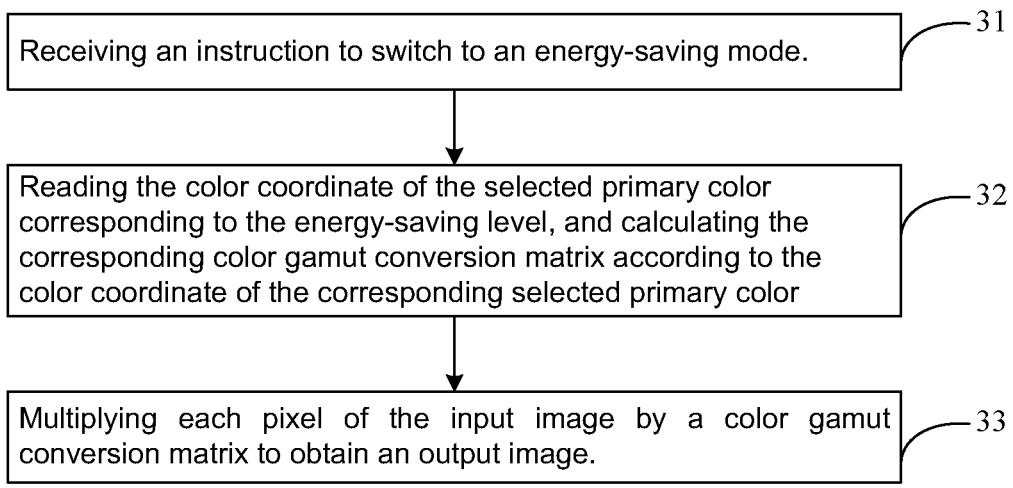
FIG. 3 is a flow chart of the energy-saving method for the display apparatus according to another embodiment of the present invention.

Referring to FIG. 3, FIG. 3 is a flow chart of the energy-saving method for the display apparatus according to another embodiment of the present invention, the method includes:

Step 31: Receiving an instruction to switch to an energy-saving mode.

The energy-saving mode is divided into a plurality of energy-saving levels, each energy-saving level corresponds to a color coordinate and a color gamut conversion matrix of different selected primary colors, respectively. The energy-saving level and its corresponding color coordinate and/or color gamut conversion matrix are stored in advance. The instruction includes the specified energy-saving level.

Wherein, the higher the energy-saving level is, the smaller the corresponding component in the corresponding color coordinate of the selected primary color is.

For example, the energy-saving level is divided into three levels, blue is the selected primary color, the blue color coordinate corresponding to the first energy-saving level is (0.136, 0.077), and the corresponding blue component z is 0.787; the blue color coordinate corresponding to the second energy-saving level is (0.14, 0.08), and the corresponding blue component z is 0.78; the blue color coordinate corresponding to the third energy-saving level is (0.153, 0.1), and the corresponding blue component is 0.747.

Step 32: Reading the color coordinate of the selected primary color corresponding to the energy-saving level, and calculating the corresponding color gamut conversion matrix according to the color coordinate of the corresponding selected primary color.

The calculation method of the color gamut conversion matrix is the same as that in the embodiment of the energy-saving method for the display apparatus provided by the present invention, and details are not described herein again.

Step 33: Multiplying each pixel of the input image by a color gamut conversion matrix to obtain an output image.

Assuming that a color image with an image size of M*N is input, multiplying M*N pixels by the above-mentioned color gamut conversion matrix A, the calculation formula of each pixel value of the output image is as follows:

$$[R'\ G'\ B'] = [R\ G\ B] \times A = [R\ G\ B] \begin{bmatrix} a_{11} & 0 & 0 \\ 0 & a_{22} & 0 \\ a_{13} & a_{23} & a_{33} \end{bmatrix}$$

Where R, G and B are the color values of the input color image and R', G' and B' are the color values of the output color image.

By dividing the energy-saving mode into multiple energy-saving levels, each energy-saving level corresponds to the different color coordinate of the selected primary color, and performing corresponding color gamut conversion, so that the power consumption is reduced.

Figure 4:
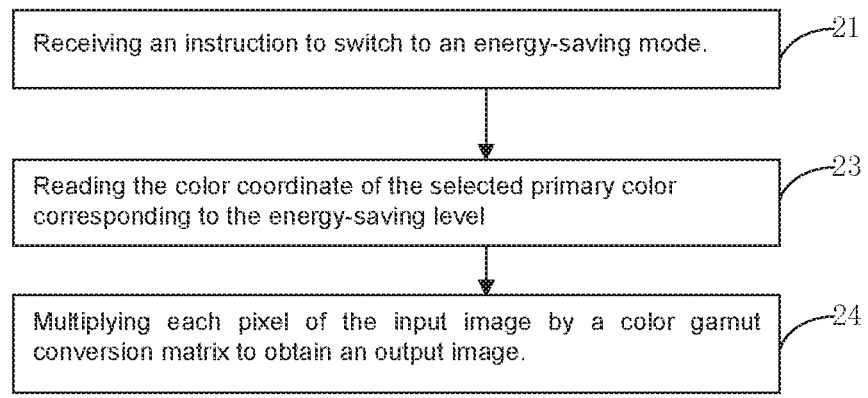
FIG. 4 is a flow chart of the energy-saving method for the display apparatus according to another embodiment of the present invention.

Referring to FIG. 4, FIG. 4 is a flow chart of the energy-saving method for the display apparatus according to another embodiment of the present invention. This embodiment is similar to another embodiment of the energy-saving method for the display apparatus provided by the present invention, except that the color gamut conversion matrix is stored in advance, the detailed steps are not repeated here.

In this embodiment, the energy-saving level, the color coordinate and the color gamut conversion matrix can be stored. For example, the energy-saving level is three levels, and the correspondence between the energy-saving level, the color coordinates and the color gamut conversion matrix are established:

| first energy-saving level | color coordinate (x1, y1) | color gamut conversion matrix A1 |
| --- | --- | --- |
| second energy-saving level | color coordinate (x2, y2) | color gamut conversion matrix A2 |
| third energy-saving level | color coordinate (x3, y3) | color gamut conversion matrix A3 |

When the acquired energy-saving level is the second energy-saving level, or the color coordinate is (x2, y2), a corresponding color gamut conversion matrix A3 can be obtained.

By storing the color gamut conversion matrix in advance, the operation of calculation of the color gamut conversion matrix is reduced so as to save time.

Figure 5:
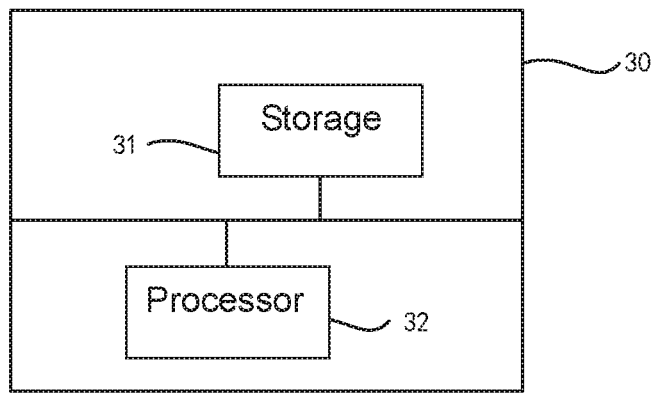
FIG. 5 is a schematic structural diagram of an energy-saving device for a display apparatus according an embodiment of the present invention.

Referring to FIG. 5, FIG. 5 is a schematic structural diagram of an energy-saving device 50 for a display apparatus according an embodiment of the present invention, including a storage 51 and a processor 52 connected to each other, the storage 51 is configured to store a computer program, when the computer program is executed by the processor 52, is used to implement the non-conflicting embodiments of the above energy-saving method for the display apparatus.

It can be understood that, the steps and operation principles performed by the energy-saving device provided in this embodiment are similar to the energy-saving method for the display apparatus in the foregoing embodiments, and details are not described herein again.

In the several embodiments provided in the present invention, it should be understood that, the disclosed methods and devices may be implemented in other manners. For example, the device implementation described above is merely exemplary. For example, the division of modules or units is merely logical function division and may be other division in actual implementation. For example, a plurality of units or components may be combining or may be integrated into another system, or some of the features may be ignored or not performed.

The units described as separate components may or may not be physically separated. The components displayed as units may or may not be physical units, that is, may be located in one place or may also be distributed to multiple network units. Some or all of the units may be selected according to actual needs to achieve the objectives of the solution of the embodiments.

In addition, each functional unit in the embodiments of the present invention may be integrated in one processing unit, or each unit may exist physically alone, or two or more units may be integrated in one unit. The above-mentioned integrated unit can be implemented in the form of hardware or in the form of software functional unit.

The foregoing contents are detailed description of the disclosure in conjunction with specific preferred embodiments and concrete embodiments of the disclosure are not limited to these descriptions. For the person skilled in the art of the disclosure, without departing from the concept of the disclosure, simple deductions or substitutions can be made and should be included in the protection scope of the application.

What is claimed is:

1. An energy-saving device for a display apparatus, comprising a storage and a processor connected to each other, the storage is configured to store a computer program, the processor is configured to execute the computer program to realize:

receiving an instruction to switch to an energy-saving mode;

responding to the instruction, converting a color gamut of an input image to obtain an output image, the output image for performing display by the display apparatus, a corresponding component in a color coordinate of a selected primary color of the output image is smaller than the corresponding component in the color coordinate of the selected primary color of the input image, an luminance of the selected primary color of the output image is less than or equal to the luminance of the selected primary color of the input image;

wherein the energy-saving mode is divided into a plurality of energy-saving levels, each energy-saving level corresponds to the color coordinate and the color gamut conversion matrix of different selected primary colors, respectively;

wherein the color coordinates of the other primary colors and white color of the input image and the output image remain unchanged;

wherein a calculation formula of each pixel value of the output image is as follows:

$$[R'\ G'\ B'] = [R\ G\ B] \times A = [R\ G\ B] \begin{bmatrix} a_{11} & 0 & 0 \\ 0 & a_{22} & 0 \\ a_{13} & a_{23} & a_{33} \end{bmatrix}$$

where R, G and B are color values of the input color image and R', G' and B' are the color values of the output color image, the calculation formula of parameters $a_{11}, a_{13}, a_{22}, a_{23}, a_{33}$ in the color gamut conversion matrix is as follows:

$$a_{11}^\gamma = Y_R'/Y_R$$

$$a_{22}^\gamma = Y_G'/Y_G$$

$$[a_{13}^\gamma \; a_{23}^\gamma \; a_{33}^\gamma] \times \begin{bmatrix} X_R & Y_R & Z_R \\ X_G & Y_G & Z_G \\ X_B & Y_B & Z_B \end{bmatrix} = [X_B' \; Y_B \; Z_B']$$

wherein γ is a gamma value of the display apparatus, $X_R$, $Y_R$, $Z_R$, $X_G$, $Y_G$, $Z_G$, $X_B$, $Z_B$ and $Y_B$ are tristimulus values of the red, green and blue at a highest gray scale before the conversion, $Y_R'$, $Y_G'$, $Y_B'$ are luminance values of the red, green and blue at the highest gray scale after the conversion, respectively, $X_B'$ and $Z_B'$ are the color values of the blue at the highest gray scale after the conversion, respectively, $Y_B'$ is a known parameter, the calculation formula of parameters $Y_R'$ and $Y_G'$ is as follows:

$$[Y_R'/y_R \; Y_G'/y_G \; Y_B'/y_B] \times \begin{bmatrix} x_R & z_R \\ x_G & z_G \\ x_B' & z_B' \end{bmatrix} = [Y_R'/y_W \; Y_G'/y_W \; Y_B'/y_W] \times \begin{bmatrix} x_W & z_W \\ x_W & z_W \\ x_W & z_W \end{bmatrix}$$

wherein $x_R$, $y_R$, $z_R$, $x_G$, $y_G$, $z_G$, $z_W$ are color coordinate values of red, green and white before the conversion, respectively.

2. The energy-saving device for the display apparatus according to claim 1, wherein the processor is configured to execute; and
multiplying each pixel of the input image by a color gamut conversion matrix to obtain the output image, the color gamut conversion matrix is corresponding to the color coordinate of the selected primary color.

3. The energy-saving device for the display apparatus according to claim 1, wherein the higher the energy-saving level is, the smaller the corresponding component in the corresponding color coordinate of the selected primary color is.

4. The energy-saving device for the display apparatus according to claim 1, wherein the instruction comprises the energy-saving level, the processor is further configured to execute; and
determining the corresponding color gamut conversion matrix according to the energy-saving level.

5. The energy-saving device for the display apparatus according to claim 1, wherein the processor is configured to execute; and
reading the color gamut conversion matrix corresponding to the energy-saving level; or
reading the color coordinate of the selected primary color corresponding to the energy-saving level, and calculating the corresponding color gamut conversion matrix according to the corresponding color coordinate of the selected primary color.

6. An energy-saving method for a display apparatus, comprising the following steps:
receiving an instruction to switch to an energy-saving mode;
responding to the instruction, converting a color gamut of an input image to obtain an output image, the output image for performing display by the display apparatus, a corresponding component in a color coordinate of a selected primary color of the output image is smaller than the corresponding component in the color coordinate of the selected primary color of the input image, an luminance of the selected primary color of the output image is less than or equal to the luminance of the selected primary color of the input image;
wherein a calculation formula of each pixel value of the output image is as follows:

$$[R' \; G' \; B'] = [R \; G \; B] \times A = [R \; G \; B] \begin{bmatrix} a_{11} & 0 & 0 \\ 0 & a_{22} & 0 \\ a_{13} & a_{23} & a_{33} \end{bmatrix}$$

where R, G and B are color values of the input color image and R', G' and B' are the color values of the output color image, the calculation formula of parameters $a_{11}, a_{13}, a_{22}, a_{23}, a_{33}$ in the color gamut conversion matrix is as follows:

$$a_{11}^\gamma = Y_R'/Y_R$$

$$a_{22}^\gamma = Y_G'/Y_G$$

$$[a_{13}^\gamma \; a_{23}^\gamma \; a_{33}^\gamma] \times \begin{bmatrix} X_R & Y_R & Z_R \\ X_G & Y_G & Z_G \\ X_B & Y_B & Z_B \end{bmatrix} = [X_B' \; Y_B \; Z_B']$$

wherein γ is a gamma value of the display apparatus, $X_R$, $Y_R$, $Z_R$, $X_G$, $Y_G$, $Z_G$, $X_B$, $Z_B$ and $Y_B$ are tristimulus values of the red, green and blue at a highest gray scale before the conversion, $Y_R'$, $Y_G'$, $Y_B'$ are luminance values of the red, green and blue at the highest gray scale after the conversion, respectively, $X_B'$ and $Z_B'$ are the color values of the blue at the highest gray scale after the conversion, respectively, $Y_B'$ is a known parameter, the calculation formula of parameters $Y_R'$ and $Y_G'$ is as follows:

$$[Y_R'/y_R \; Y_G'/y_G \; Y_B'/y_B] \times \begin{bmatrix} x_R & z_R \\ x_G & z_G \\ x_B' & z_B' \end{bmatrix} = [Y_R'/y_W \; Y_G'/y_W \; Y_B'/y_W] \times \begin{bmatrix} x_W & z_W \\ x_W & z_W \\ x_W & z_W \end{bmatrix}$$

wherein $x_R$, $y_R$, $z_R$, $x_G$, $y_G$, $z_G$, $z_W$ are color coordinate values of red green and white before the conversion, respectively.

7. The energy-saving method for the display apparatus according to claim 6, wherein the color coordinates of the other primary colors and white color of the input image and the output image remain unchanged.

8. The energy-saving method for the display apparatus according to claim 6, wherein the step of converting the color gamut of the input image to obtain the output image comprises:
multiplying each pixel of the input image by a color gamut conversion matrix to obtain the output image, the color gamut conversion matrix is corresponding to the color coordinate of the selected primary color.

9. The energy-saving method for the display apparatus according to claim 6, wherein the energy-saving mode is divided into a plurality of energy-saving levels, each energy-saving level corresponds to the color coordinate and the color gamut conversion matrix of different selected primary colors, respectively.

10. The energy-saving method for the display apparatus according to claim 9, wherein the higher the energy-saving level is, the smaller the corresponding component in the corresponding color coordinate of the selected primary color is.

11. The energy-saving method for the display apparatus according to claim 10, wherein the instruction comprises the energy-saving level, before the step of multiplying each pixel of the input image by the color gamut conversion matrix to obtain the output image further comprising:
determining the corresponding color gamut conversion matrix according to the energy-saving level.

12. The energy-saving method for the display apparatus according to claim 11, wherein the step of determining the corresponding color gamut conversion matrix according to the energy-saving level comprises:
reading the color gamut conversion matrix corresponding to the energy-saving level; or
reading the color coordinate of the selected primary color corresponding to the energy-saving level, and calculating the corresponding color gamut conversion matrix according to the corresponding color coordinate of the selected primary color.

13. A display apparatus comprising an energy-saving device for display apparatus, wherein the energy-saving device for display apparatus comprises a storage and a processor connected to each other, the storage is configured to store a computer program, the processor is configured to execute the computer program to realize:
receiving an instruction to switch to an energy-saving mode;
responding to the instruction, converting a color gamut of an input image to obtain an output image, the output image for performing display by the display apparatus, a corresponding component in a color coordinate of a selected primary color of the output image is smaller than the corresponding component in the color coordinate of the selected primary color of the input image, an luminance of the selected primary color of the output image is less than or equal to the luminance of the selected primary color of the input image;
wherein a calculation formula of each pixel value of the output image is as follows:

$$[R'\ G'\ B'] = [R\ G\ B] \times A = [R\ G\ B] \begin{bmatrix} a_{11} & 0 & 0 \\ 0 & a_{22} & 0 \\ a_{13} & a_{23} & a_{33} \end{bmatrix}$$

where R, G and B are color values of the input color image and R', G' and B' are the color values of the output color image, the calculation formula of parameters $a_{11}$, $a_{13}$, $a_{22}$, $a_{23}$, $a_{33}$ in the color gamut conversion matrix is as follows:

$$a_{11}^\gamma = Y_R'/Y_R$$

-continued $$a_{22}^\gamma = Y_G'/Y_G$$

$$[a_{13}^\gamma\ a_{23}^\gamma\ a_{33}^\gamma] \times \begin{bmatrix} X_R & Y_R & Z_R \\ X_G & Y_G & Z_G \\ X_B & Y_B & Z_B \end{bmatrix} = [X_B'\ Y_B\ Z_B']$$

wherein γ is a gamma value of the display apparatus, $X_R$, $Y_R$, $Z_R$, $X_G$, $Y_G$, $Z_G$, $X_B$, $Z_B$ and $Y_B$ are tristimulus values of the red, green and blue at a highest gray scale before the conversion, $Y_R'$, $Y_G'$, $Y_B'$ are luminance values of the red, green and blue at the highest gray scale after the conversion, respectively, $X_B'$ and $Z_B'$ are the color values of the blue at the highest gray scale after the conversion, respectively, $Y_B'$ is a known parameter, the calculation formula of parameters $Y_R'$ and $Y_G'$ is as follows:

$$[Y_R'/y_R\ Y_G'/y_G\ Y_B'/y_B] \times \begin{bmatrix} x_R & z_R \\ x_G & z_G \\ x_B' & z_B' \end{bmatrix} = [Y_R'/y_W\ Y_G'/y_W\ Y_B'/y_W] \times \begin{bmatrix} x_W & z_W \\ x_W & z_W \\ x_W & z_W \end{bmatrix}$$

wherein $x_R$, $y_R$, $z_R$, $x_G$, $y_G$, $z_G$, $z_W$ are color coordinate values of red green and white before the conversion, respectively.

14. The display apparatus according to claim 13, wherein the color coordinates of the other primary colors and white color of the input image and the output image remain unchanged.

15. The display apparatus according to claim 13, wherein the processor is configured to execute; and
multiplying each pixel of the input image by a color gamut conversion matrix to obtain the output image, the color gamut conversion matrix is corresponding to the color coordinate of the selected primary color.

16. The display apparatus according to claim 13, wherein the higher the energy-saving level is, the smaller the corresponding component in the corresponding color coordinate of the selected primary color is.

17. The display apparatus according to claim 13, wherein the instruction comprises the energy-saving level, the processor is further configured to execute; and
determining the corresponding color gamut conversion matrix according to the energy-saving level.

18. The display apparatus according to claim 13, wherein the processor is configured to execute; and
reading the color gamut conversion matrix corresponding to the energy-saving level; or
reading the color coordinate of the selected primary color corresponding to the energy-saving level, and calculate the corresponding color gamut conversion matrix according to the corresponding color coordinate of the selected primary color.

\* \* \* \* \*